(12) United States Patent
Lemmers et al.

(10) Patent No.: US 7,969,122 B2
(45) Date of Patent: Jun. 28, 2011

(54) POLE COUNT CHANGING GENERATOR

(75) Inventors: Glenn C. Lemmers, Loves Park, IL (US); Darin R. Morman, Rockford, IL (US); Eric J. Cunningham, Winnebago, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 793 days.

(21) Appl. No.: 11/939,667

(22) Filed: Nov. 14, 2007

(65) Prior Publication Data

US 2009/0121688 A1    May 14, 2009

(51) Int. Cl.
*H02P 9/10*    (2006.01)
*H02P 9/00*    (2006.01)

(52) U.S. Cl. .................. 322/59; 322/44; 322/89; 322/62

(58) Field of Classification Search .................... 322/44, 322/59, 89, 29, 62; 310/179, 180, 184
See application file for complete search history.

(56) References Cited

U.S. PATENT DOCUMENTS

| | | | |
|---|---|---|---|
| 4,338,534 A | | 7/1982 | Broadway |
| 4,403,160 A | * | 9/1983 | Hibino ........................... 310/184 |
| 4,628,245 A | * | 12/1986 | Quayle ............................ 322/32 |
| 6,011,377 A | | 1/2000 | Heglund |
| 6,351,095 B1 | | 2/2002 | Edelson |
| 6,396,161 B1 | * | 5/2002 | Crecelius et al. ............ 290/36 R |
| 6,465,928 B1 | | 10/2002 | Shervington |
| 6,876,176 B2 | * | 4/2005 | Stefanovic et al. ............. 322/20 |
| 6,891,346 B2 | | 5/2005 | Simmons |
| 6,903,477 B2 | * | 6/2005 | Kusase et al. .................. 310/180 |
| 7,116,019 B2 | | 10/2006 | Edelson |
| 7,168,913 B2 | | 1/2007 | Lardellier |
| 7,210,653 B2 | | 5/2007 | Atkey |
| 7,216,475 B2 | | 5/2007 | Johnson |
| 7,224,147 B2 | | 5/2007 | Shah |
| 2005/0206352 A1 | * | 9/2005 | Xu et al. .......................... 322/52 |
| 2008/0150494 A1 | * | 6/2008 | Lemmers et al. .................. 322/6 |

OTHER PUBLICATIONS

U.S. Appl. No. 11/645,438, filed Dec. 26, 2006.

* cited by examiner

*Primary Examiner* — Julio Cesar Gonzalez

(74) *Attorney, Agent, or Firm* — Carlson, Gaskey & Olds, PC

(57) ABSTRACT

Disclosed is a pole count changing generator capable of altering the number of poles contained within a generator. This pole count change is accomplished by changing the path through which electrical current is capable of traveling in response to a control signal sent to a pole count changing circuit.

12 Claims, 5 Drawing Sheets

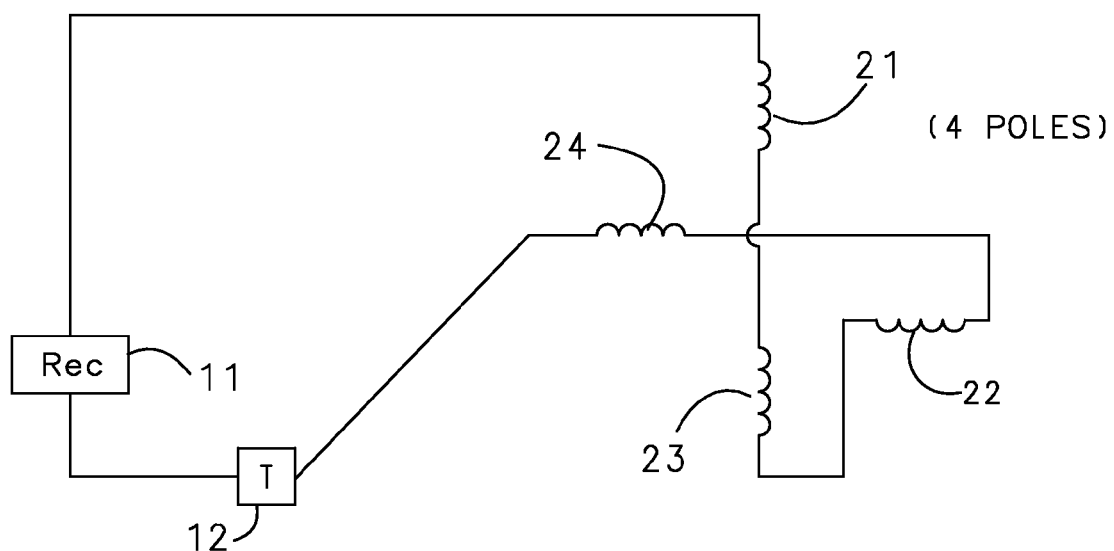
F I G. 3

POLE COUNT CHANGING GENERATOR

BACKGROUND OF THE INVENTION

This application relates generally to electrical power generation by an aircraft, and more specifically to a pole count changing electric generator.

A typical turbofan gas turbine engine for an aircraft has a high-pressure (HP) spool shaft and a low-pressure (LP) spool shaft. The LP spool shaft is turned by the low pressure turbine of an aircraft turbofan engine and typically operates across a broader range of rotational speeds. The HP spool shaft typically operates within a narrower range of rotational speeds. It is additionally known that coupling a rotating shaft (such as the HP or the LP spool shaft) from a turbofan engine to an electric generator can be an efficient source of electrical power generation on an aircraft.

Some vehicles incorporating gas turbine engines, such as aircraft, require significant amounts of electric power for operation. In some aircraft applications, a typical generator driven at the typical speed range of a HP spool shaft would produce electric current within a frequency range of 360-800 Hz. This frequency range is acceptable. Therefore, the high-pressure (HP) spool shaft of a turbine engine is typically used to generate electricity for an aircraft system. However, in some aircraft applications the demand for electric power exceeds the power extraction potential of the HP spool shaft.

The rotational speed of an LP spool shaft varies over a much broader range, typically encompassing rotational speeds having a speed ratio of 4.44:1. Although power extraction from the LP spool shaft is possible, the broader range of rotational speeds of the LP spool shaft would produce current whose frequency exceeds the 360-800 Hz range at higher speeds.

If power were delivered to the onboard electronics at too high of a frequency it could damage the onboard electronics. Due to the wider shaft speed range of the LP spool shaft, generators using the current state of the art cannot consistently generate electrical power from the LP shaft rotation at a usable frequency.

Electrical generators contain a number of rotor poles. The number of rotor poles combined with the speed of the rotor determines the output frequency of the electrical power from the generator. A potential solution to the frequency range problem described above is illustrated in pending U.S. patent application Ser. No. 11/645,438 (the '438 application) "Pole Shifting Generator" invented by the inventor of this application. The '438 application discloses a generator that utilizes a transistor network to shift the polarity of certain pole pairs thereby altering the number of magnetic poles an electric generator sees without reducing the number of poles through which current travels, and consequently reducing the output frequency.

Despite the difficulty of consistently generating usable electric power from the LP spool shaft, it is highly desirable to utilize the LP spool shaft's rotation to generate usable electric power. It is therefore desirable to design a generator that can provide output power at a usable frequency across the entire speed range of the LP spool shaft rotation.

SUMMARY OF THE INVENTION

An embodiment of the present application incorporates a pole count changing circuit, which is capable of altering the number of rotor poles through which current can travel. The pole count changing circuit is activated through the use of a control signal.

These and other features of the present invention can be best understood by one skilled in the art from the following specification and drawings. A brief description of the drawings that accompany the detailed description follows.

BRIEF DESCRIPTION OF THE DRAWINGS

FIG. 3 illustrates the effective circuit of the generator while no control signal is being sent.

DETAILED DESCRIPTION OF THE PREFERRED EMBODIMENT

Methods and systems designed to convert rotational energy from a source such as a gas turbine aircraft engine into electrical power are well known in the art. A typical electrical generator serving this function will contain a number of rotor poles and a number of stator phases. The rotor poles contain electrical windings that, when current flows through them, produce magnetic fields generating electrical current in the stator and thereby generates electricity. Electrical generators for performing this operation utilize a number of rotor poles to facilitate power generation. The number of rotor poles and the rotational speed of the rotor correspond directly to the output frequency of the electrical power. It is additionally known in the art to design a system to have a certain number of rotor poles to achieve a desired output frequency. When choosing the number of poles it is important to realize that the theoretical output frequency is directly related to the number of poles contained in the generator.

Figure 1:
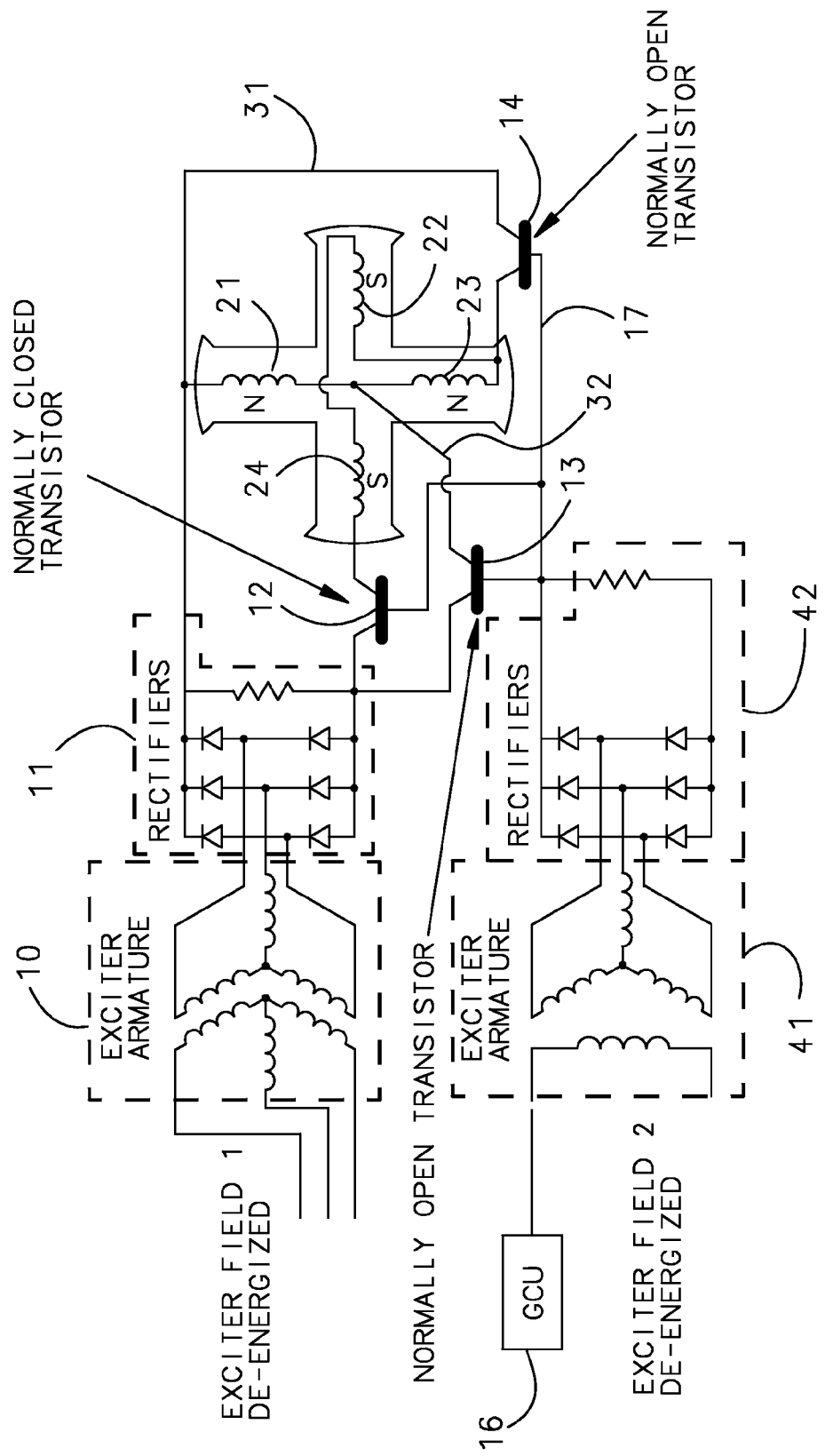
FIG. 1 illustrates a detailed circuit diagram of a generator.

FIG. 1 illustrates a 4-pole generator with the switching elements 12, 13, and 14 added pursuant to an embodiment of the present application. In the case of the illustrated embodiment while no control signal is being sent by the generator control unit 16 the circuit will operate as a standard 4-pole generator. This is effective because any switching element 12 in the closed position has essentially no impact on the current flow, and any switching elements 13 and 14 in the open position prevent current flow. In this case the resulting effect is the prevention of current flow through the wires 31 and 32 that redirect current.

Figure 2:
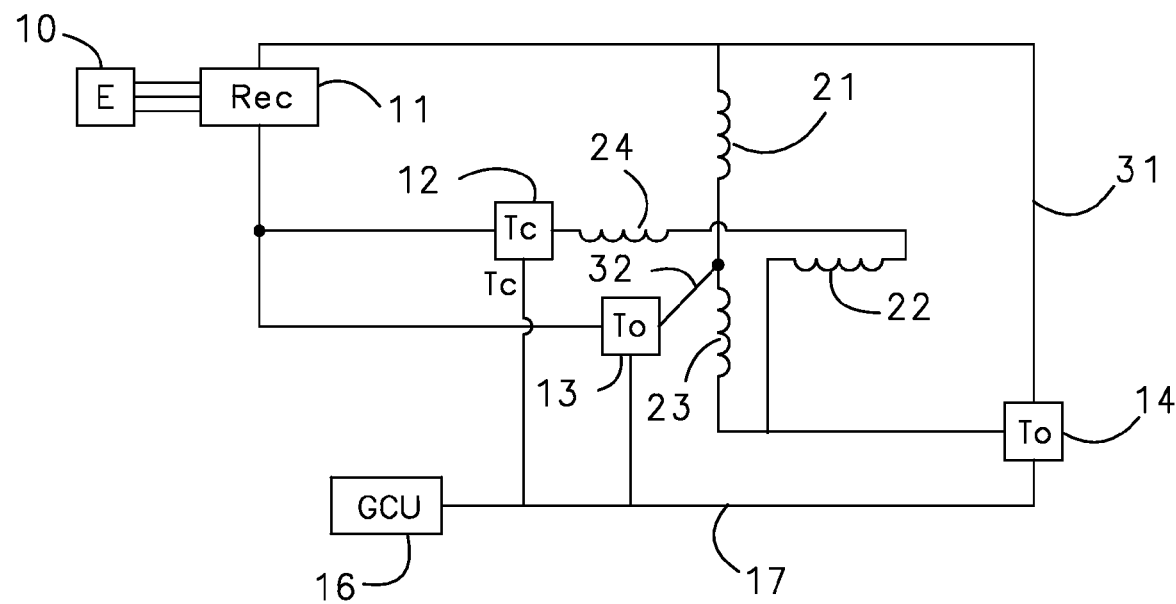
FIG. 2 illustrates a box diagram of the circuit for the generator.
Figure 4:
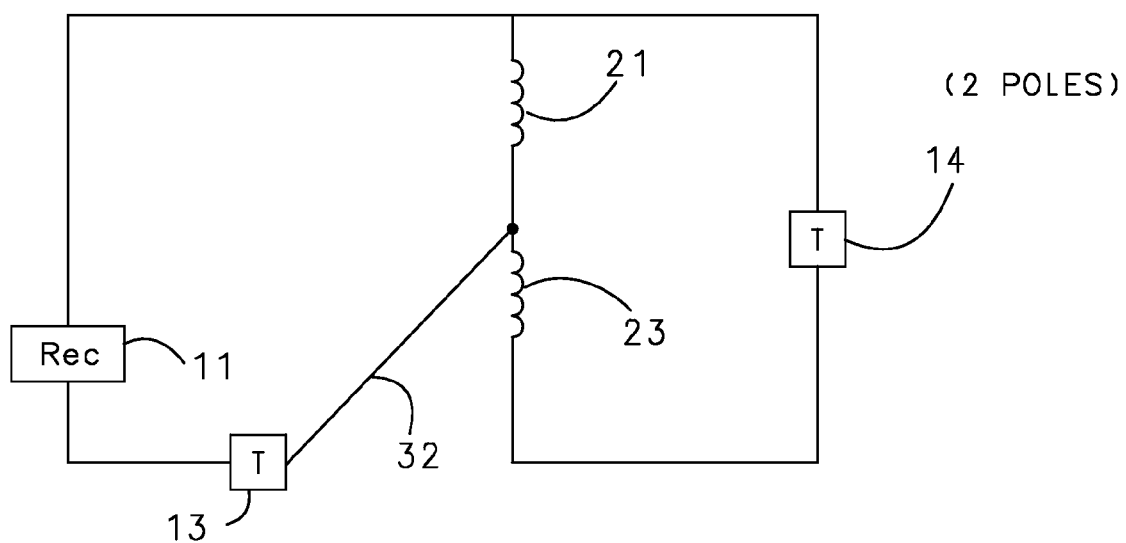
FIG. 4 illustrates the effective circuit of the generator while a positive control signal is being sent.

FIG. 2 gives a simplified block circuit diagram of the circuit illustrated in FIG. 1. The exciter 10 is inductively coupled to the rectifier 11. The generator control unit 16 provides a control signal to each of the three switching elements 12, 13, and 14 in the switching network. The control unit receives a signal indicating the speed of the engine shaft (not pictured), and then determines what the appropriate number of poles should be. When the shaft speed meets or exceeds a preset speed the general control unit 16 sends a control signal along a wire 17 to the switching elements 12, 13, and 14. In the illustrated embodiment the switching elements 12, 13, and 14 all use one shared wire 17 for their control signal. It is, however, anticipated that a generator control unit 16 could additionally control each switching element 12, 13, and 14 separately. Once the pole count is changed the effective circuit of the illustrated embodiment would change from that of a 4-pole generator (FIG. 3) to that of a 2 pole generator (FIG. 4). In FIG. 4 the current is redirected through two switching elements 13 and 14, which results in the current avoiding two of the poles 22 and 24. While the illustrated embodiment uses a generator control unit 16 to effectuate this change, it is anticipated that any form of control could be used in its place including manual control. Additionally it is anticipated that the generator control unit 16 could turn on an exciter field 41, as shown in FIG. 1, which would then in turn provide a control signal along a wire 17 to each of the switching elements 12, 13, and 14.

The pole count changing circuit illustrated in FIG. 2 contains three transistors 12, 13, and 14. Transistors normally operate in either an open circuit state (normally open transistors), or a closed circuit state (normally closed transistors). The illustrated embodiment of FIG. 2 shows all three transistors receiving a single control signal from the generator control unit 16. Under normal operating conditions in the illustrated embodiment, current is allowed to flow through rotor pole 21, then rotor pole 23, then rotor pole 22, and finally rotor pole 24 before returning to the rectifier 11. This current path is allowed because transistor 12 allows current to pass under normal conditions, and transistors 13 and 14 do not. When the transistors 12, 13, and 14 receive a control signal they switch states such that the normally closed transistor 12 will create an open circuit, and the normally open transistors 13 and 14 will create a closed circuit. This results in a current path where the current leaves the rectifier 11, and is split between two parallel paths. The first path allows current to travel through rotor pole 21, then through transistor 13, and finally back to rectifier 11. Additionally current travels in a parallel path through transistor 14, then through rotor pole 23, and then rejoining the other path traveling through transistor 13. In this way current is only allowed to travel through two of the rotor poles 21 and 23, and is prevented from traveling through the other two rotor poles 22 and 24. It is anticipated that different current paths, or switching elements may be used to achieve the same effect, and that simple modifications, such as using mechanical disconnects instead of transistors, may be made to these arrangements to accommodate a device having a different number of rotor poles.

Figure 5:
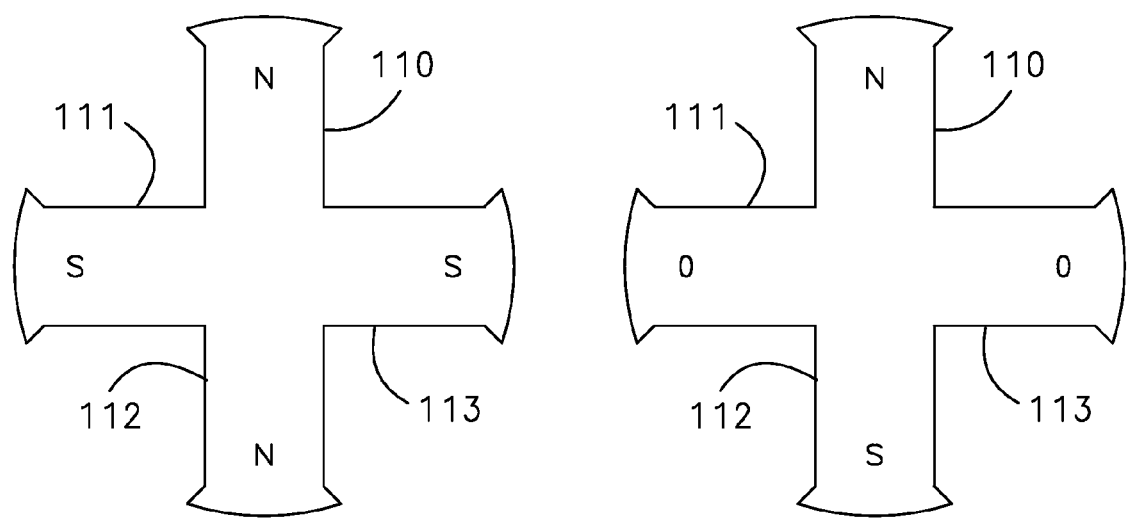
FIG. 5 illustrates the pole configurations of the generator in both of its states.

FIG. 5 shows the magnetic alignment of each of the poles. While the generator is operating in normal mode there are 2 "north" poles 110 and 112 and 2 "south" poles 111 and 113. When switched to reduced rotor pole count mode, the two formerly south poles 111 and 113 are removed from the circuit and have no electromagnetic effect. At the same time, one of the formerly north poles 112 is converted into a south pole 112. This maintains an equal number of north and south poles ensuring balanced electrical output. For this reason the number of poles 110, 111, 112, and 114 in a pole count changing generator using the depicted configuration might be best divisible by 4. It is, however, anticipated that alternate configurations could have other numbers of poles.

Although an embodiment of this invention has been disclosed, a worker of ordinary skill in this art would recognize that certain modifications would come within the scope of this invention. Among these modifications would be increasing the number of poles while operating in the "normal" condition, utilizing a different high to low speed ratio (i.e. switching from 6 to 2, or 8 to 2 instead of 4 to 2), or reversing the switching network to create a pole increasing generator.

The foregoing description shall be interpreted as illustrative and not in any limiting sense. A worker of ordinary skill in the art would recognize that certain modifications come within the scope of this invention. For that reason, the following claims should be studied to determine the true scope and content of this invention.

What is claimed is:

1. A pole count changing generator comprising,
    an electrical generator having a first number of rotor poles under at least one first condition;
    a pole count changing circuit connected to said electrical generator, said pole count changing circuit comprising a circuit path switching component network capable of redirecting current flow;
    said pole count changing circuit being capable of altering said first number of rotor poles through which current can travel to a second number of rotor poles through which current can travel, said second number of rotor poles being half said first number of rotor poles;
    said pole count changing circuit being activated to alter the number of rotor poles through the use of at least one activation signal;
    wherein said circuit path switching component network comprises a transistor network and a controller,
    said transistor network comprising at least one transistor in a normally closed state and at least one transistor in a normally open state; and
    wherein said at least one normally closed transistor and said at least one normally open transistor arranged such that current flow is allowed through all the rotor poles of the pole count changing generator under said at least one first condition.

2. The generator of claim 1, where said transistor network is further arranged such that current flow is redirected through only a portion of the rotor poles of the pole count changing generator when at least one control signal is sent to it.

3. A pole count changing generator comprising,
    an electrical generator having a first number of rotor poles under at least one first condition, wherein said first condition comprises a rotor speed range;
    a pole count changing circuit connected to said electrical generator;
    said pole count changing circuit being capable of altering said first number of rotor poles through which current can travel to a second number of rotor poles through which current can travel, said second number of rotor poles being half said first number of rotor poles;
    said pole count changing circuit being activated to alter the number of rotor poles through the use of at least one activation signal; and
    wherein said pole count changing circuit allows said first number of rotor poles when said rotor speed range is less than a predicted limit and alters said number of rotor poles to be less than said first number when said speed range exceeds said predicted limit.

4. The generator of claim 3, where the first number of rotor poles is an integer divisible by 4.

5. The generator of claim 3, further comprising,
    said pole count changing circuit comprising a circuit path switching component network capable of redirecting current flow.

6. The generator of claim 5, where said circuit path switching component network comprises a transistor network and a controller.

7. An aircraft engine comprising;
    an engine;
    an electrical generator coupled to said engine such that said electrical generator is capable of receiving shaft power from said engine;
    said electrical generator having a first number of poles under at least one first condition, wherein said first condition comprises a rotor speed range;

said electrical generator having a pole count changing device capable of routing current through a second number of rotor poles when said at least one first condition changes, said second number of rotor poles being half of said first number of rotor poles;

said pole count changing device has a component network for redirecting current flow connected to the electrical generator, and said component network for redirecting current flow is configured to re-route current flow through only a portion of the first number of rotor poles when a control signal is received; and wherein said pole count changing circuit allows said first number of rotor poles when said rotor speed range is less than a predicted limit and alters said number of rotor poles to be less than said first number when said speed range exceeds said predicted limit.

8. The aircraft engine of claim 7, where the first number of rotor poles is an integer divisible by 4.

9. The aircraft engine of claim 7, where said pole count changing device is capable of being activated by an automated controller.

10. The aircraft engine of claim 7, where said pole count changing device is capable of being activated by a person.

11. A pole count changing generator comprising, an electrical generator having a first number of rotor poles under at least one first condition, wherein said first condition comprises a rotor speed range;

a pole count changing circuit connected to said electrical generator;

said pole count changing circuit being capable of altering said first number of rotor poles through which current can travel to a second number of rotor poles through which current can travel, said second number of rotor poles being double said first number of rotor poles;

said pole count changing circuit being activated to alter the number of rotor poles through the use of at least one activation signal; and wherein said pole count changing circuit allows said first number of rotor poles when said rotor speed range is less than a predicted limit and alters said number of rotor poles to be less than said first number when said speed range exceeds said predicted limit.

12. An aircraft engine comprising;

an engine;

an electrical generator coupled to said engine such that said electrical generator is capable of receiving shaft power from said engine;

said electrical generator having a first number of poles under at least one first condition, wherein said first condition comprises a rotor speed range;

said electrical generator having a pole count changing device capable of routing current through a second number of rotor poles when said at least one first condition changes, said second number of rotor poles being double of said first number of rotor poles;

said pole count changing device has a component network for redirecting current flow connected to the electrical generator, and said component network for redirecting current flow is configured to re-route current flow through only a portion of the first number of rotor poles when a control signal is received; and wherein said pole count changing circuit allows said first number of rotor poles when said rotor speed range is less than a predicted limit and alters said number of rotor poles to be less than said first number when said speed range exceeds said predicted limit.

* * * * *